(12) United States Patent
Ronström et al.

(10) Patent No.: US 6,308,169 B1
(45) Date of Patent: Oct. 23, 2001

(54) METHOD OF STORING ELEMENTS IN A DATABASE

(75) Inventors: Ulf Mikael Ronström, Hägersten; Ataullah Dabaghi, Huddinge, both of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/115,948

(22) Filed: Jul. 15, 1998

(30) Foreign Application Priority Data

Jul. 21, 1997 (SE) .................................................. 97 02760

(51) Int. Cl.⁷ ................................................... G06F 17/30
(52) U.S. Cl. ................................................ 707/2; 707/202
(58) Field of Search ..................... 707/2, 4, 101, 707/103, 202, 206, 3, 5; 382/253

(56) References Cited

U.S. PATENT DOCUMENTS

| 5,857,207 | * | 1/1999 | Lo et al. ............................ | 707/203 |
| 5,897,637 | * | 4/1999 | Guha ................................. | 707/101 |
| 5,974,421 | * | 10/1999 | Krishnaswamy et al. .......... | 707/103 |
| 5,991,455 | * | 11/1999 | Choo et al. ........................ | 382/253 |
| 6,128,627 | * | 10/2000 | Mattis et al. ....................... | 707/202 |
| 6,134,546 | * | 10/2000 | Bestgen et al. .................... | 707/4 |

* cited by examiner

*Primary Examiner*—Sanjiv Shah
(74) *Attorney, Agent, or Firm*—Burns, Doane, Swecker & Mathis, L.L.P.

(57) ABSTRACT

The present invention relates to a method of storing elements in a database and of finding such stored elements. A reference to a storage space intended for the storage of a data element in the database is calculated by means of a mathematical function, wherein the function input data is an external key belonging to the element, and wherein the result obtained with the mathematical function points to an internal position of the element in the database. The result is divided into at least three parts (A, B, C). A first part (A) constitutes a reference to a fragment (A4) belonging to the database, a second part (B) constitutes a reference to a page (B4) within the fragment (A4), and a third part (C) constitutes a reference to a so-called bucket (C4) belonging to the page (B4). A bucket (C4) is comprised of at least one container in which the element can be stored, or is stored. The containers are given a size that corresponds to the size of a container header and the elements belonging to the container, said size varying with the amount of elements concerned. The size of a maximum container is limited so as to be at the most equal to the amount of data-information that can be read at one time into a cache memory belonging to a processor that operates within the database or that uses the database.

33 Claims, 2 Drawing Sheets

METHOD OF STORING ELEMENTS IN A DATABASE

FIELD OF INVENTION

The present invention relates to a method of storing elements in a database and of finding such stored elements. A reference to a storage space intended for the storage of a data element in the database is calculated by means of a mathematical function, such as a hash function, wherein the function input data is comprised of an external key belonging to the element, and wherein the result obtained with the mathematical function points to an internal position in the database for said element. The invention is also based on dividing the result of the function into different parts.

BACKGROUND OF THE INVENTION

It has long been known to store data in a database with the aid of different data structures. These structures provide different advantages with respect, for instance, to used storage space and the possibility of carrying out rapid searches.

One known structure is based on a so-called hash function which enables a random distribution of elements in a table in a database to be calculated.

An element can include an internal address in a database. The element is coupled to an external key, such as a telephone number, for instance. When entering a new telephone number in a table, a calculation is made as to in which element the internal address of the telephone number shall be placed with the aid of a hash function.

The purpose of the hash function is to distribute the addresses randomly in the table so that these addresses will be distributed uniformly therein. The same hash function is then used to find the correct element when searching for a specific address.

When using a hash function on a key, there is obtained a hash value that is comprised of a data-word which normally includes 32 bits.

One type of algorithm used in this respect is linear hashing (LH), where the data-word obtained from the function includes so-called LH-bits, among other things. Put simply, the LH-bits obtained can point to a page in the database, or to a position in a register where said position points to a page, and the sought element is located somewhere on this page.

It is known to perform hashing in two stages, in order to make the search for an element more effective. The dataword obtained is divided into two groups of bits in these two stages.

The first group of bits point, for instance, to an index in a vector and this index can point to a new vector. The second group of bits points to an index in the new vector, wherein this new index points, for instance, to a first element in a linked list of elements. The sought element is then found somewhere in this linked list of elements.

Such linked lists may have mutually different lengths. An internal address lies in each element. The various links are placed physically at totally different locations within a memory, but are linked together by means of pointers.

Thus, when searching for a certain element, there is obtained the header of a linked list of elements. If the internal address sought for is not found in the first element, the search is continued in the next element in the linked list. Since the next element in the linked list is positioned physically somewhere else in the memory, further access to the memory is normally required in order to pick-up this next element. This first pick-up of the wrong element is a so-called cache-miss.

Thus, a person searching for a certain element may suffer several cache-misses, depending on the length of the lists, which is a very expensive process. In next generation processors, a cache-miss will be corresponded time-wise by hundreds of instructions.

It is therefore desirable to minimise the number of cache-misses. An ideal situation is one in which a sought element can be found when the memory is first accessed.

It is also known, according to the aforegoing, to allow a hash value to point to a position in a register or to a vector where a value in this position points further in the database, so as to enable dynamic changes to be made in a database, thereby enabling an element to be moved between, e.g., different pages, with subsequent changing of the value in the register for this element, without needing to assign a new hash value to the element.

It is also known that a distributed database will include a plurality of nodes that form a common system in a common database. The information in a distributed database is distributed in the different nodes that are included.

A node can include a primary replica of one or more parts of the database and a secondary replica of one or more other parts of the database. A primary replica with an associated secondary replica is normally referred to as a fragment.

The following publications are considered to provide a comprehensive picture of known technology in this particular field:

"Linear Hashing: A New Tool for File and Tables Addressing", W. Litwin, reprinted from VLDB-80 in Readings in Database Systems, 2nd ed., M. Stonebraker (ed.), Morgan Kaufman, 1994.

"LH*—Linear Hashing for Distributed Files", W. Litwin, M.-A. Neimat, D. A. Schneider, ACM SIGMOD Int'l. Conf. on Management of Data, 1993.

"High-Availability LH* Schemes with Mirroring", W. Litwin, M. A. Neimat.

"LH*LH: A Scalable High Performance Data Structure for Switched Microcomputers", J. S. Karlsson, W. Litwin, T. Risch, 5th Int'l. Conf. on Extending Database Technology (EDBT '96).

"Dynamic Hash Tables", P.-A. Larsson, Communications of the ACM, April, 1988.

"Main-Memory Linear Hashing—Some Enhancements of Larson's Algorithm", M. Pettersson, University of Linköping, Sweden, March, 1993.

SUMMARY OF THE INVENTION

TECHNICAL PROBLEMS

When considering the present state of the art as described above, it will be seen that a technical problem resides in the provision of a method whereby an element can be stored, searched for, and re-found without, in the majority of cases, resulting in a cache-miss or, in certain cases, in solely one cache-miss.

Another technical problem is one of enabling the resolution to be enhanced when searching for an element, so that a search will provide the possibility of reading-in the sought element on the first occasion of reading into the cache-memory, or in exceptional cases on the second read-in occasion.

Another technical problem is one of providing a method whereby a data structure can be formed that makes such resolution and searching possible.

Another technical problem is one of enabling all replicas of an element belonging to a fragment, such as primary and secondary replicas, to be found when searching the element.

Another technical problem is one of devising a storage structure format, here designated container, that is able to store a plurality of elements and that can also be read into a cache memory in its entirety.

A related technical problem is then one of enabling the storage of an element which, according to the mathematical function, shall be stored in a container that is already full.

Yet another technical problem resides in enabling the storage of an element which, according to the mathematical function, shall be stored on a page that is already full.

Still another technical problem is one of providing simple and effective handling of available page space for the storage of containers that grow or shrink in size as a result of adding further elements thereto or removing existing elements therefrom.

Another technical problem is one of enabling the effective use of an available memory where many containers does not fill the allocated memory space.

In this regard, a technical problem is one of enabling this use when respective containers increase or decrease in size with time.

Thus, another technical problem is one of enabling the double-use of a space that is adapted for a container having a specific largest permitted size, i.e. a maximum container.

Yet another technical problem is one of providing a container format that provides necessary information as to whether or not all elements that shall be present within the container according to the mathematical function are in fact actually present, and information as to where elements that may not have found accommodation in the container are located, such that the search for such elements will solely generate a single cache-miss.

A technical problem resides in the ability to provide such information, regardless of whether the element or elements that was/were not accommodated is/are located on the same page as the container or on different pages.

Another technical problem is one of providing an element format that provides necessary information for making the element available for different types of locking in conjunction with transactions that affect said element.

Another technical problem is one of enabling an element to include dynamic attributes, such as keys of mutually different sizes.

Yet another technical problem is one of providing necessary information for the element to be able to participate in a number of different replicating processes.

Another technical problem is one of providing necessary information for the element to be able to participate in a division of a fragment or in the combining of several fragments.

SOLUTION

With a starting point from a method according to the aforegoing and with the intention of providing a solution to one or more of the aforesaid technical problems, it is proposed in accordance with the invention that the result obtained with the mathematical function is divided into at least three parts, where a first part constitutes a direct or an indirect reference to a fragment belonging to the database, a second part constitutes a direct or an indirect reference to a page within the fragment, and a third part constitutes a direct or indirect reference to a bucket belonging to said page.

Such a bucket will include at least one container in which the element can be stored, or is already stored, or in which a direct or indirect reference to said element is stored.

With the intention of enabling affected fragments, pages, buckets or elements to be changed in different ways without needing to calculate a new value from the mathematical function, the present invention proposes the possibility of using direct or indirect references selectively.

By a direct reference is meant an internal address that points directly to an intended position, possibly via re-processing the address information, for instance via a further mathematical function. By an indirect reference is meant a pointer which points to a table, a register or the like, in which a relevant internal address that points directly to intended positions is available.

The accessibility of intended elements is achieved partially by the fact that:
the first part forms an indirect reference to all replicas belonging to the fragment, which makes all replicas available through the reference;
the second part points to a register that is comprised of a vector of pointers to different pages; and that
the third part points to a bucket belonging to said page, via a mathematical function.

A thus indicated bucket includes a container, and possibly an associated overfill-container.

With the intention of enabling an entire container to be read into a cache memory that belongs to a processor which operates within the database or which utilises said database, it is proposed in accordance with the invention that the container format is designed in a special way. Respective containers are allocated a size that corresponds to the size of a container header and the size of the elements belonging to the container.

The size varies with the number of elements that belong to the container, although the maximum size to which a container is allowed to grow, referred to here as a maximum container, is limited to the size that can be read into a cache memory belonging to a processor that operates within the database or to a processor that utilises said database, at one and the same time.

With the intention of enabling storage space available on respective pages to be used in an effective manner and also to enable a sought bucket to be easily found, it is proposed in accordance with the invention that the pages are divided up into a number of buffers. Respective buffers are divided into a first part and a second part of a so-called availability-list-limit.

Respective buffers are adapted to include:
a maximum container that accommodates the whole of the first and the second parts; or
a first non-maximum container with a start in the first part that extends into the second part; or
a first non-maximum container with a start in the first part, and a possible second non-maximum container with a start in the second part.

A first number of buffers are comprised of static buffers, and a second number of buffers are comprised of free buffers. The first part belonging to the static buffers is adapted to include a container, and the second part belonging to the static buffers and both the parts belonging to the free buffers are adapted to include an overfill container.

Depending on the efficacy of the mathematical function, the majority of containers will be less than maximum, while many of the containers will not even be at half maximum, meaning that these latter containers will occupy one part of the buffer.

In turn, this means that many buffers are able to provide space for two containers. In these cases, it is proposed in accordance with the invention, that a container which is placed within a first part starts at the beginning of the first part and when further elements are added to the container grows towards the centre of associated buffer, and that a container which is placed within a second part starts at the end of said second part and, when further elements are added to the container, grows towards the centre of associated buffer.

When the mathematical function despite all else assigns an element to a position within a container that is already filled to a maximum, it is proposed in accordance with the invention that the relevant bucket is adapted to include an overfill container, and that this further element is allocated a position in the overfill container.

With the object of further simplifying handling of available storage space in a page and in making such handling more effective, it is proposed in accordance with the invention that an availability-list will include all available second parts that belong to the static buffers and all available first and second parts belonging to the free buffers on a page.

An available second part belonging to a buffer is removed from the availability-list when a non-maximum container in a corresponding first part exceeds the availability-list-limit in size.

An available second part belonging to a buffer is added to the availability-list when a container within a corresponding first part that has earlier exceeded the availability-list-limit in size decreases and no longer exceeds the availability-list-limit.

Since both parts in a buffer for a maximum container are occupied, it is proposed in accordance with the invention that an overfill container is allocated a position within a part that is available on the availability-list, and that said available part is removed from the availability-list in this allocation.

It is also proposed in accordance with the invention that one of the pages belonging to said fragment is comprised of an overfill page which includes solely free buffers. The overfill container is allocated a position within a part that belongs to a buffer on the overfill page when no parts are available on the availability-list in the own page.

A container header includes four information carrying fields.

A first information carrying field includes information concerning container size.

When a bucket includes only one container:
  the second information carrying field indicates that a possible overfill container exists on the same page;
  the third information carrying field indicates that there is no overfill container;
  the fourth information carrying field is not used.

When a bucket includes a container and an overfill container on the same page:
  the second information carrying field indicates that a possible overfill container exists on the same page;
  the third information carrying field indicates that an overfill container exists;
  the fourth information carrying field points to the overfill container.

When a bucket includes an overfill container on the overfill page:
  the second information carrying field indicates that an overfill container exists on the overfill page;
  the third information carrying field includes a pointer that points to the overfill page;
  the fourth information carrying field includes a pointer that points to the overfill container.

The size of respective fields is adapted to respective situations.

With the intention of enabling maximum use of the space within a container, it is proposed in accordance with the invention that the elements belonging to a container are allocated positions immediately behind the header and immediately behind one another in the container.

It is also proposed that the whole of the container pointed out through the mathematical function is read into a cache memory belonging to the processor that requests an element.

When the element is not found in the container read into the cache memory, the whole of the overfill container is read into the cache memory.

In order to enable handling of an element when replicating, moving, combining or dividing fragments, it is proposed in accordance with the invention that respective elements shall be allocated a special format.

According to this format, an element shall include an element header and five groups of information.

When an element is available for transactions:
  a first group will include a part of the result obtained with the mathematical function;
  a second group will include element status bits;
  a third group will contain information to the effect that the element is not locked;
  a fourth group will include information relating to the length of a local key belonging to said element; and
  a fifth group will contain information relating to the length of an element key belonging to said element.

When the element is locked against transactions due to an ongoing transaction that affect said element:
  the first and the second groups will include a pointer that points to a transaction register belonging to the transaction;
  the third group will include information to the effect that the element is locked;
  the fourth group will include information relating to the length of the local key; and
  the fifth group will include information relating to the length of the element key.

A transaction register belonging to the transaction that affects said element will include part of the result obtained with the function, the status bits, and the type of lock that has been applied to the element, i.e. the lock mode.

The element also includes a local key and an element-key.

The element header is comprised of four bytes, and the first group is comprised of 19 bits, the second group is comprised of 4 bits, the third group is comprised of 1 bit, the fourth group is comprised of 4 bits and the fifth group is comprised also of 4 bits.

The status bits are used in element replicating processes, such as in fragment replicating processes. Respective bits indicate whether the element is replicated or not replicated.

Thus, a number of simultaneous replicating processes, in this example up to four processes, can each use a respective status bit.

Part of the result obtained with the mathematical function is used in fragment-dividing processes and fragment-combining processes.

ADVANTAGES

Those advantages primarily afforded by an inventive method reside in the ability to find a desired element with only a single memory access, or when the desired element is positioned within an overfill container with only two memory accesses. The correct container is indicated through the hash function.

The container size is adapted so that the whole of the container can be read into the cache memory with a single access to the memory. Once having found the correct container in the cache memory, the correct element can be quickly found from among the serially stored elements in the container, with the aid of present-day processors.

The primary characteristic features of an inventive method are set forth in the characterising clause of the following claim 1.

BRIEF DESCRIPTION OF THE DRAWINGS

A method that includes the features associated with the present invention will now be described in more detail by way of example and with reference to the accompanying drawings, in which.

DETAILED DESCRIPTION OF PREFERRED EMBODIMENTS

Figure 1:
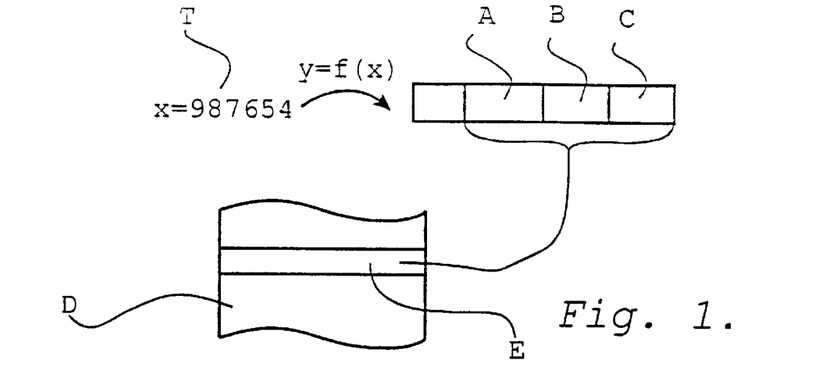
FIG. 1 illustrates schematically the use of a mathematical function in the conversion of an external key to an internal key.

FIG. 1 shows the use of an external key, such as a telephone number T, belonging to an element E, as input data for a mathematical function f(x).

The result y obtained with the function f(x) points to the internal position of the element E in a database D. Result y is divided into at least three parts A, B, C.

Figure 2:
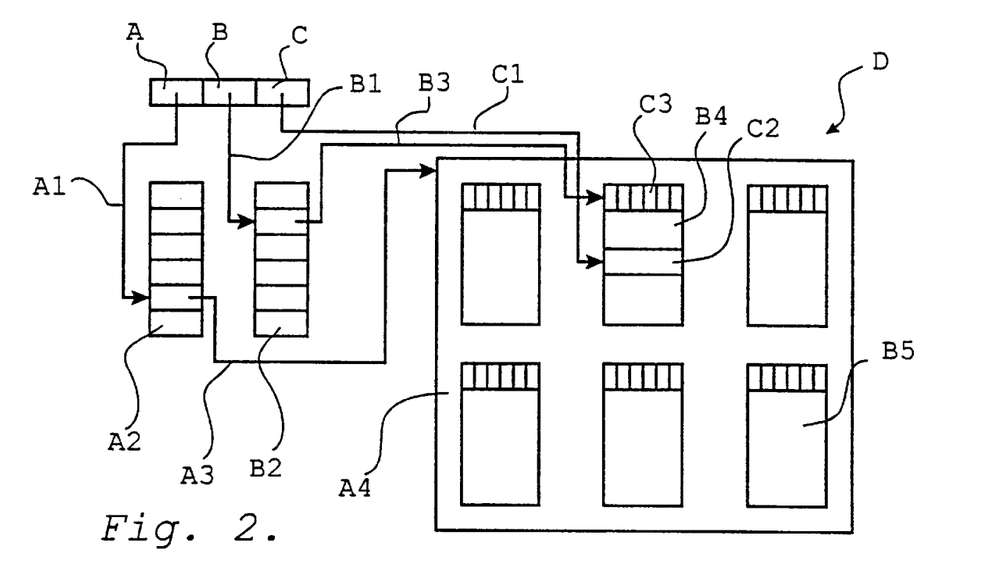
FIG. 2 illustrates schematically the division of the result obtained with the mathematical function into indirect references to a position of an element.

FIG. 2 is intended to show that a first part A constitutes an indirect reference A1 to a fragment A4 belonging to the database D. This reference A1 points to a position in a table A2 that covers different fragments, where information A3 disclosing where all copies belonging to the fragment A4 are stored is available.

A second part B constitutes an indirect reference B1 to a page B4 within the fragment A4. This reference B1 is comprised of a pointer which points to a register B2 that is comprised of a vector of pointers B3 to different pages, of which one is the page B4.

A third part C constitutes a direct reference C1 to a so-called bucket C2 belonging to the page B4.

In this way, the value y obtained with the mathematical function f(x) provides a direct address to a specific bucket C2.

Figure 3:
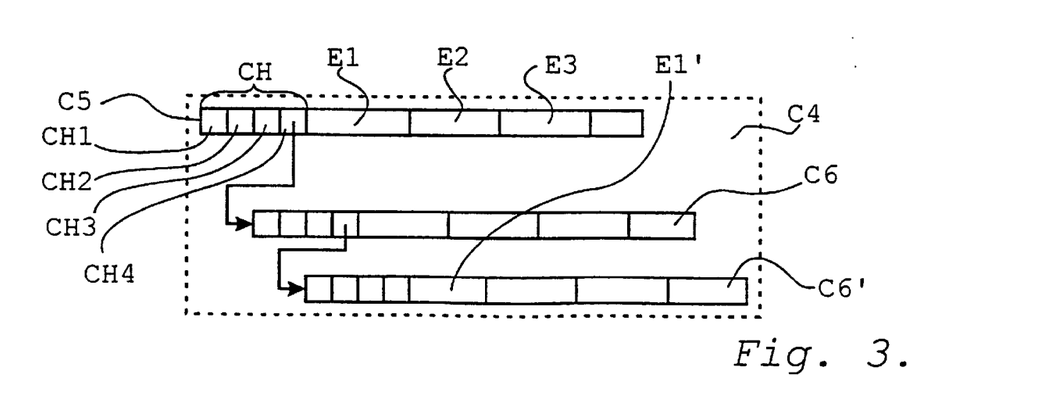
FIG. 3 is a schematic illustration of a bucket structure.

According to FIG. 3, respective buckets C2 include a container C5 and possibly also an overfill container C6 belonging to the bucket C4.

FIG. 3 also shows that respective containers C6 are allocated a size which corresponds to the size of a header CH and to the size of elements E1, E2, E3, . . . , belonging to the container C6.

This size can vary with the number of elements, although the size of a maximum container is limited so as to equal at most the size of what can be read at one time into a cache memory belonging to a processor operating within the database or using said database.

Normally, present-day processors are able to read into the cache memory 128 bytes at a time, and the following description is based on this value. It will be understood, however, that the size of a container according to the present invention, and other dimensions recited in the following description shall be adapted in accordance with how much can be read into the cache memory of concerned processors at any one time, in order to achieve the desired effect.

Another parameter to which attention may be needed in future applications of the present invention is the time taken to process the content of information that is read into the cache memory. When the process time exceeds the time for a cache-miss, it is suitable to limit the size of a container, and other dimensions, to a size in which processing of a container will take less time than the time lapse for a cache-miss, regardless of how much information can be read into the cache memory at a time.

Figure 4:
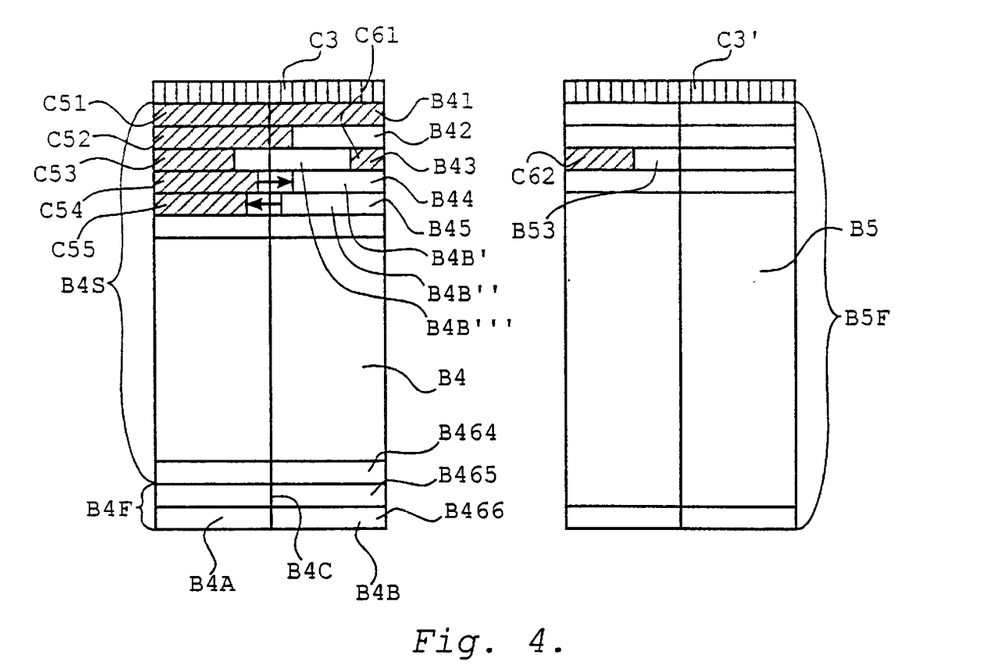
FIG. 4 illustrates schematically the division of the pages belonging to a fragment.

According to FIG. 4, a page B4 is divided into a number of buffers B41, B42, B43, . . . , B466. Respective buffers are divided up into a first B4A and a second B4B parts of a so-called availability-list-limit B4C, and respective buffers are adapted to include:

a maximum container C51 that accommodates the whole of the first part B4A and of the second part B4B; or a first non-maximum container C52 with a start in the first part B4A that extends into the second part B4B; or a first non-maximum container C53 with a start in the first part B4A, and a possible second non-maximum container C61 with a start in the second part B4B.

A first number of buffers are comprised of static buffers B4S, and a second number of buffers are comprised of free buffers B4F.

The example according to FIG. 4 includes a page that has 8 kBytes (8192 bytes). This page includes a header C3 which has 8 bytes, 64 static buffers B4S and 2 free buffers B4F, each of 124 bytes.

This structure enables the addressing of a specific bucket, and therewith a specific buffer, constituted by the third part C of the result y obtained with the mathematical function f(x) to be obtained by adapting this part of the result to form a random number "a" between 1 (one) and 64 (sixty-four), which is the number of buffers. This number "a" is multiplied by 124 (the number of bytes in each buffer) and the number 8 (eight) is then added to the product, this being the number of bytes in the header C3.

It can thus be said that the third part C of the mathematical function f(x) constitutes an address which points directly to the intended position, although through the medium of a further mathematical function, this function being "a"*124+8 in the present example.

There is thus pointed out in accordance with the mathematical function f(x) a random buffer and also the bucket located within this buffer.

The first part B4A belonging to the static buffers B4S is adapted to include a container C5, and the second part B4B belonging to the static buffers B4S and both parts B4A, B4B belonging to the free buffers B4F are adapted to include an overfill container C6.

A container C5 located within a first part B4A starts at the beginning of the first part B4A and grows towards the centre of an associated buffer when a further element E is added to the container C5.

A container C6 placed within a second part B4B starts at the end of the second part B4B and grows towards the centre of an associated buffer when a further element E is added to the container C6.

This allows two containers to be held within a common buffer, despite a buffer actually being adapted to hold only one container of maximum permitted size.

In the case of an efficient mathematical function f(x), all elements E that are present will be divided randomly and evenly in existing containers C5, meaning that the majority of containers C5 will not be filled to their permitted maximum. Many of these containers will also lie beneath the availability-list-limit B4C, meaning that a number of other parts B4B will be available for any overfill containers C6.

It is proposed in accordance with one preferred embodiment of the present invention that the check which ascertains how the space within a buffer shall be divided between two containers that share a common buffer is left to these two containers, regardless of whether the availability-list-limit is exceeded by one container or not. Thus, a very small overfill container C6 can permit a container C5 to grow to an extent that exceeds the availability-list-limit, provided that the buffer can provide sufficient space for the two containers.

A relevant bucket C2 is adapted to include an overfill container C6 when a further element E is added to a container C5 of maximum permitted size and belonging to said bucket, where this further element is allocated a position in the overfill container C6.

An availability list is adapted to include all available second parts B4B belonging to the static buffers B4S, and all available first parts B4A and available second parts B4B belonging to the free buffers B4F in a page B4. The header C3 for a page B4 includes a pointer to this availability list, among other things.

The availability list can be implemented an be implemented by including all available parts in a linked list of available parts, where respective available parts include a pointer to the next available part in the linked list. The pointer in the header points to the first available part.

An available second part B4B' belonging to a buffer B44 is removed from the availability-list when a non-maximum container C54 in a corresponding first part exceeds the availability-list-limit B4C in size.

An available second part B4B" belonging to a buffer B45 is added to the availability-list when a container C55 in a corresponding first part that had earlier exceeded the availability-list-limit B4C in size decreases and no longer exceeds the availability-list-limit.

It is also possible to introduce a certain hysteresis when a second part is removed from or added to the availability-list in conjunction with a container in the first part increasing or decreasing in size.

For instance, a second part can be removed from the availability-list only after a container in the first part having exceeded the availability-list-limit by a predetermined value.

Similarly, a second part can be added to the availability-list in conjunction with a reduction in size of a container only when the container has decreased in size and lies beneath the availability-list-limit by a predetermined margin.

This hysteresis is able to prevent any oscillation effects that would occur in conjunction with a container increasing and decreasing in size periodically for some reason or other, immediately around the availability-list-limit.

An overfill container C61 is allocated a position in a part B4B''' that is available on the availability-list, and the earlier available part B4B''' is removed from the availability-list when this allocation takes place.

In order to guard against the situation in which no parts are available on the availability-list, it is proposed in accordance with the invention that one of the pages belonging to the fragment A4 is comprised of an overfill page B5. This overfill page B5 includes only free buffers B5F. An overfill container C62 is allocated a position in a part belonging to a buffer B53 on the overfill page B5 in the event of no parts being available on the availability-list.

According to FIG. 3, the header CH belonging to a container C5 includes four information carrying fields CH1, CH2, CH3, CH4, where the first information carrying field CH1 includes information concerning the size of the container.

When a bucket C2 includes only one container:
the second information carrying field CH2 indicates that a possible overfill container C6 exists on the same page B4;
the third information carrying field CH3 indicates that no overfill container C6 exists;
the fourth information carrying field CH4 is not used.

When a bucket C2 includes a container Cs and an overfill container C6 on the same page B4:
the second information carrying field CH2 indicates that a possible overfill container C6 exists on the same page B4;
the third information carrying field CH3 indicates that an overfill container C6 exists;
the fourth information carrying field CH4 points to the overfill container C6.

When a bucket CS includes an overfill container C6 on the overfill page B5:
the second information carrying field CH2 indicates that an overfill container C6 exists on the overfill page B5;
the third information carrying field CH3 includes a pointer that points to the overfill page B5;
the fourth information carrying field CH4 includes a pointer that points to the overfill container C6.

The size of respective fields CH1, CH2, CH3, CH4 is adapted to respective situations.

Similarly to the third part of the result obtained with the mathematical function, the pointer in the fourth information carrying field is comprised of a number between 1 and 64, which is the number of buffers, multiplied by 124, which is the number of bytes for respective buffers, to which an 8 is added, which is the number of bytes in the header. This is not done randomly, however, but in accordance with which buffers are available on the availability-list.

Respective elements E1, E2, E3, . . . are allocated positions immediately behind the header CH and one after the other in a container.

Theoretically, it is possible for an overfill container C6 to reach a maximum permitted size and therewith, in turn, need to refer to a further overfill container C6'. For this reason, all containers, including overfill containers, will include a header according to the above. If a bucket C2 should need to include two or more overfill containers, which is highly improbable in practice, this would, in turn, result in the same number of cache-misses when searching for an element E1' in the last overfill container C6'.

When a processor searches for an element E, the whole of the container C5 pointed out through the mathematical function f(x) is read into a cache memory belonging to the processor.

When the element E is not found in the container C5 that has been read into the cache memory, the whole of the overfill container C6 is read in to the cache memory.

An element E also includes a header, an element header EH with five groups of information. According to the invention, the element header is adapted so as to enable an element E to be described in two different cases.

Figure 5:
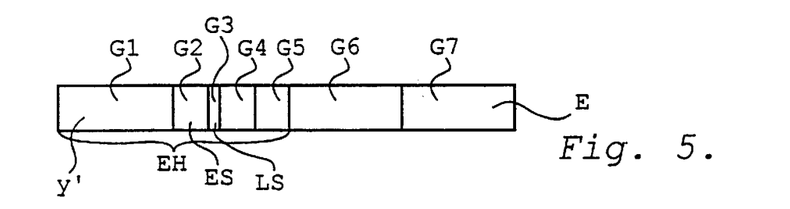
FIG. 5 illustrates schematically the construction of an element in a first case.

FIG. 5 is intended to show the construction of the element E when the element is available for transactions. In this case, a first group G1 includes a part of the result y' obtained with the mathematical function f(x), a second group G2 includes status bits ES for the element E, a third group G3 includes information that the element is not locked LS (Lock Status), a fourth group G4 includes information relating to the length of a local key belonging to the element, and a fifth group G5 includes information relating to the length of an element-key belonging to the element.

An element E also includes a local key G6 and an element-key G7.

Figure 6:
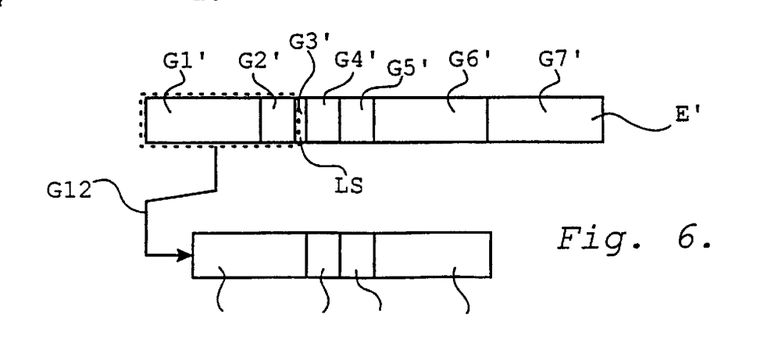
FIG. 6 illustrates schematically the construction of an element in a second case.

FIG. 6 is intended to show the construction of an element E' when the element is locked against transactions, due to an ongoing transaction that affects the element E'.

In the illustrated case, the first and the second groups G1', G2' together include a pointer G12 which points to a transaction register TR belonging to the transaction and the transaction register TR includes the part of the result y' from the mathematical function f(x), the status bits ES, and the type of lock that has been applied to the element LM (Lock Mode), and the third group G3' includes information to the effect that the element is locked LS.

In the illustrated case, the fourth group G4' also includes information concerning the length of the local key G6', and the fifth group G5' includes information concerning the length of the element-key G7'.

The element header EH is comprised of four bytes, where the first group G1 is comprised of 19 bits, the second group G2 is comprised of four bits, the third group G3 is comprised of 1 bit, the fourth group G4 is comprised of four bits and the fifth group G5 is also comprised of four bits.

The status bits ES are intended for use in element replicating processes, such as when replicating a fragment A4, where respective bits indicate whether the element E has been copied or not. This enables a plurality of simultaneous replicating processes, in the illustrated case four such processes, to each utilise a respective status bit.

The part of the result y' obtained with the mathematical function f(x) is intended for use in fragment dividing processes and fragment combining processes.

One type of mathematical function f(x) with which elements can be distributed randomly and evenly in a database is a so-called hash function, which can be used conveniently in carrying out the present invention.

For the sake of simplicity, the described embodiment has been restricted to illustrate the handling of keys that have a size of up to 120 bytes. However, the person skilled in this art will realise the modifications and adaptations that must be made in order to be able to use even larger keys within the inventive concept.

It will therefore be understood that the invention is not restricted to the aforedescribed and illustrated embodiment, and that modifications can be made within the scope of the inventive concept as defined in the following claims.

What is claimed is:

1. A method of storing elements in a database and of finding such stored elements, wherein a reference to the storage space intended for the storage of a data element in the database is calculated by means of a mathematical function, wherein the function input data is comprised of an external key belonging to said element, wherein the result obtained with said mathematical function points to an internal position in the database for said element, and wherein the result is divided into different parts, wherein said result is divided into at least three parts, in that a first part constitutes a direct or indirect reference to a fragment belonging to said database; in that a second part constitutes a direct or indirect reference to a page in said fragment; in that a third part constitutes a direct or indirect reference to a so-called bucket belonging to said page; in that said bucket includes at least one container in which said element can be stored, or is already stored, or wherein a direct or indirect reference to said element is stored; in that the size of a maximum-size container is limited so as to be at the most equal to the amount of data information that can be read at one time into a cache memory belonging to a processor operating within the database or utilising said database; and in that, where the time taken to process the amount of information that can be read at one time into a cache memory exceeds the time for a cache-miss, the maximum-growth size of a container is limited so that the time taken to process a maximum-size container will be less than the time lapse for a cache-miss, regardless of how much data-information can be read into the cache memory at a time.

2. A method according to claim 1, wherein a direct reference is comprised of an internal address that points directly to an intended position or via a mathematical function; and in that an indirect reference constitutes a pointer which points to a table in which a relevant internal address that points directly to the intended position is available.

3. A method according to claim 1, wherein said first part constitutes an indirect reference to all replicas that belong to said fragment.

4. A method according to claim 1, wherein said second part points to a register; and in that said register is comprised of a vector of pointers that point to different pages.

5. A method according to claim 1, wherein said third parts points to a relevant bucket belonging to said page; and in that pointing is effected via a mathematical function.

6. A method according to claim 1, wherein respective buckets include a container and possibly also an overfill container belonging to a respective bucket.

7. A method according to claim 6, wherein the whole of the container indicated by said mathematical function is read into a cache memory belonging to a processor that searches for an element.

8. A method according to claim 7, wherein the whole of the overfill container is read into said cache memory, when said element is not found in the container that has been read into said cache memory.

9. A method according to claim 1, wherein respective containers are allocated a size which corresponds to the size of the header and to the size of elements that belong to said container; and in that said size varies with the number of elements belonging to said container.

10. A method according to claim 9, wherein said page is divided into a number of buffers; in that respective buffers are divided into a first part and a second part of a so-called availability-list-limit; in that respective buffers are adapted to include a maximum-size container that accommodates the whole of said first and said second parts, or a first non-maximum container with a start in said first part that extends into said second part, or a first non-maximum container with a start in said first part that does not extend into said second part, and a possible second non-maximum container with a start in said second part.

11. A method according to claim 1, wherein said page is divided into a number of buffers; in that respective buffers are divided into a first part and a second part of a so-called availability-list-limit; in that respective buffers are adapted to include a maximum-size container that accommodates the whole of said first and said second parts, or a first non-maximum container with a start in said first part that extends into said second part, or a first non-maximum container with a start in said first part that does not extend into said second part, and a possible second non-maximum container with a start in said second part.

12. A method according to claim 11, wherein the check as to whether a memory space within a buffer shall be divided between two containers that share a common buffer is assigned to said two containers, regardless of whether or not the availability-list-limit is exceeded by one or the other of said containers.

13. A method according to claim 11, wherein a first number of buffers is comprised of static buffers; in that a second number of buffers is comprised of free buffers; in that the first part belonging to said static buffers is adapted to include a container; and in that said second part belonging to said static buffers and both parts belonging to said free buffers are adapted to include an overfill container.

14. A method according to claim 13, wherein a container placed within a first part starts at the beginning of said first part and when a further element is added to said container grows towards the centre of the associated buffer; and in that a container that is placed within a second part starts at the end of said second part and grows towards the centre of the associated buffer when a further element is added to the container.

15. A method according to claim 13, wherein a relevant bucket is adapted to include an overfill container when a further element is allocated to a maximum sized container belonging to said bucket; and in that said further element is allocated a position within said overfill container.

16. A method according to claim 15 wherein said overfill container is allocated a position within a part that is available on said availability list; and in that said available part is removed from said list at the time of said allocation.

17. A method according to claim 16, wherein said header includes four information carrying fields, of which a first information carrying field includes information concerning the size of said container, and in that when the bucket includes only one container:
said second information carrying field indicates that a possible overfill container exists on the same page;
the third information carrying field indicates that no overfill container exists;
the fourth information field is not used; in that when the bucket includes a container and an overfill container on the same page;
the second information carrying field indicates that a possible overfill container exists on the same page;
the third information carrying field indicates that an overfill container exists;
the fourth information carrying field points to said overfill container; in that when said bucket includes an overfill container on said overfill page:
the second information carrying field indicates an overfill container exists on said overfill page;
the third information carrying field includes a pointer which points to said overfill page;
said fourth information carrying field includes a pointer that points to said overfill container; and in that the size of respective fields is adapted to respective situations; and in that elements belonging to said container are allocated positions immediately behind said header and after one another in said container.

18. A method according to claim 17, wherein the whole of the overfill container is read into said cache memory, when said element is not found in the container that has been read into said cache memory.

19. A method according to claim 15 wherein one of the pages belonging to said fragment is an overfill page; in that said overfill page includes solely free buffers; and in that said overfill container is allocated a position within a part belonging to a buffer on said overfill page when no parts are available in the availability list.

20. A method according to claim 19, wherein said header includes four information carrying fields, of which a first information carrying field includes information concerning the size of said container, and in that when the bucket includes only one container:
said second information carrying field indicates that a possible overfill container exists on the same page;
the third information carrying field indicates that no overfill container exists;
the fourth information field is not used;
in that when the bucket includes a container and an overfill container on the same page:
the second information carrying field indicates that a possible overfill container exists on the same page;
the third information carrying field indicates that an overfill container exists;
the fourth information carrying field points to said overfill container;
in that when said bucket includes an overfill container on said overfill page:
the second information carrying field indicates that an overfill container exists on said overfill page;
the third information carrying field includes a pointer which points to said overfill page;
said fourth information carrying field includes a pointer that points to said overfill container; and
in that the size of the respective fields is adapted to respective situations; and in that elements belonging to said container are allocated positions immediately behind said header and after one another in said container.

21. A method according to claim 13, wherein an availability list is adapted to include all available second parts belonging to said static buffers and all available first and second parts belonging to said free buffers on said page.

22. A method according to claim 21, wherein an available second part belonging to a buffer is removed from said availability list when a non-maximum container within a corresponding first part exceeds the availability-list-limit with respect to size.

23. A method according to claim 22 wherein the introduction of an hysteresis which, when an available second part shall be removed from or added to said availability list in conjunction with an increase or decrease in the size of a container within said first part, causes a second part to be removed from said availability list after a container within said first part has exceeded the availability-list-limit by a predetermined value; and in that a second part is added to the availability list after a container within said first part has decreased and lies beneath said availability-list-limit by a predetermined value.

24. A method according to claim 22, wherein said overfill container is allocated a position within a part that is available on said availability list; and in that said available part is removed from said list at the time of said allocation.

25. A method according to claim 22, wherein one of the pages belonging to said fragment is an overfill page; in that said overfill page includes solely free buffers; and in that said overfill container is allocated a position within a part belonging to a buffer on said overfill page when no parts are available in the availability list.

26. A method according to claim 21, wherein an available second part belonging to a buffer is added to the availability list when a container within a corresponding first part that has earlier exceeded said availability-list-limit with respect to size decreases and no longer exceeds said limit.

27. A method according to claim 26, wherein the introduction of an hysteresis which, when an available second part shall be removed from or added to said availability list in conjunction with an increase or decrease in the size of a container within said first part, causes a second part to be removed from said availability list after a container within said first part has exceeded the availability-list-limit by a predetermined value; and in that a second part is added to the availability list after a container within said first part has decreased and lies beneath said availability-list-limit by a predetermined value.

28. A method according to claim 1, wherein said element includes a header with five groups of information; in that when said element is available for transactions a first group will include a part of the result obtained with said mathematical function, a second group will comprise element status bits, a third group will comprise information to the effect that the element is not locked, a fourth group will include information relating to the length of a local key belonging to said element, a fifth group will include information relating to the length of an element key belonging to said element; and in that said element also includes said local key and said element key.

29. A method according to claim 28, wherein when the element is locked against transactions due to an ongoing transaction that affects said element, the first and second groups together will include a pointer that points to a transaction register belonging to said transaction; in that said transaction register includes said part of the result obtained with said mathematical function, said status bits, and the type of lock that has been applied to said element; in that said third group includes information to the effect that said element is locked; in that said fourth group includes information relating to the length of said local key; and in that said fifth group includes information relating to the length of said element key.

30. A method according to claim 29, wherein said header is comprised of four bytes; in that said first group comprises 19 bits, said second group comprises four bits, said third group comprises 1 bit, said fourth group comprises four bits, and said fifth group comprises four bits.

31. A method according to claim 28, wherein said status bits are used in element replicating processes, such as in replicating said fragment; in that respective bits indicate whether or not said element has been replicated; and in that a plurality of simultaneous replicating processes each use their respective status bit.

32. A method according to claim 28, wherein said part of the result obtained with said mathematical function is used in fragment dividing processes and fragment combining processes.

33. A method according to claim 1, wherein said page is divided into a number of buffers; in that respective buffers are divided into a first part and a second part of a so-called availability-list-limit; in that respective buffers are adapted to include a maximum-size container that accommodates the whole of said first and said second parts, or a first non-maximum container with a start in said first part that extends into said second part, or a first non-maximum container with a start in said first part that does not extend into said second part, and a possible second non-maximum container with a start in said second part.

\* \* \* \* \*